United States Patent
Wendling et al.

(10) Patent No.: US 9,338,163 B2
(45) Date of Patent: May 10, 2016

(54) METHOD USING A SINGLE AUTHENTICATION DEVICE TO AUTHENTICATE A USER TO A SERVICE PROVIDER AMONG A PLURALITY OF SERVICE PROVIDERS AND DEVICE FOR PERFORMING SUCH A METHOD

(71) Applicant: NAGRAVISION S.A., Cheseaux-sur-Lausanne (CH)

(72) Inventors: Bertrand Wendling, Divonne-les-Bains (FR); Joel Wenger, Etoy (CH)

(73) Assignee: NAGRAVISION S.A., Cheseaux-sur-Lausanne ( * ) Notice: Subject to any disclaimer, the term of this patent is extended or adjusted under 35 U.S.C. 154(b) by 22 days.

(21) Appl. No.: 14/133,219

(22) Filed: Dec. 18, 2013

(65) Prior Publication Data

US 2014/0181520 A1 Jun. 26, 2014

Related U.S. Application Data

(60) Provisional application No. 61/740,459, filed on Dec. 21, 2012.

(30) Foreign Application Priority Data

Dec. 21, 2012 (EP) .................................... 12198886

(51) Int. Cl.
*H04L 29/06* (2006.01)
*G06Q 20/34* (2012.01)

(52) U.S. Cl.
CPC ........ *H04L 63/0869* (2013.01); *G06Q 20/3572* (2013.01); *H04L 63/08* (2013.01); *H04L 63/0853* (2013.01)

(58) Field of Classification Search
USPC .......................................................... 705/67
See application file for complete search history.

(56) References Cited

U.S. PATENT DOCUMENTS

| 2003/0056096 A1* | 3/2003 | Albert et al. ................... 713/168 |
| 2009/0176480 A1 | 7/2009 | Jones et al. |
| 2011/0047373 A1* | 2/2011 | Karasawa et al. ............. 713/156 |

OTHER PUBLICATIONS

Cheng-Chi Lee et al., "An Efficient Authentication Protocol for Mobile Communications", Telecommunication Systems: Modeling, Analysis, Design and Management, vol. 46, No. 1, pp. 31-41, Jan. 15, 2010.
A. Menezes et al., "Chapter 10: Identification and Entity Authentication", Handbook of Applied Cryptography, CRC Press, pp. 385-424, Oct. 1, 1996.
"Product Data Sheet—306 Series", NagraID Security—Kudelski Group, Aug. 17, 2011 (2 pages).
European Search Report issued in EP 12 19 8886, dated Jun. 4, 2013.

* cited by examiner

*Primary Examiner* — Ghazal Shehni
(74) *Attorney, Agent, or Firm* — DLA Piper LLP US

(57) ABSTRACT

A method for authenticating a user to a provider, among a plurality of providers. The method uses an authentication device comprising, for each of provider, a record comprising a pairing key and first data, both as shared data. Provider authentication data comprises a first cryptogram obtained by encrypting said first data with said pairing key. Authenticating provider authentication data is performed at the authentication device by the steps of decrypting said first cryptogram by means of the pairing key stored in one of said records, then comparing the result of this decryption with first data resulting from pairing data stored in said record, if the comparison does not indicate a match, then processing again the previous decryption and comparison steps by using the pairing key of another record until each of said records stored in the authentication device has been processed.

14 Claims, 3 Drawing Sheets

METHOD USING A SINGLE AUTHENTICATION DEVICE TO AUTHENTICATE A USER TO A SERVICE PROVIDER AMONG A PLURALITY OF SERVICE PROVIDERS AND DEVICE FOR PERFORMING SUCH A METHOD

CROSS-REFERENCE TO RELATED APPLICATIONS

This application claims priority to European patent Application No. EP 12198886.9, filed Dec. 21, 2012 and to U.S. Provisional patent Application No. 61/740,459, filed Dec. 21, 2012. The entire contents of both of these applications are incorporated by referenced herein.

TECHNICAL FIELD

The present invention relates to the field of electronic data exchanges, such as on-line services or e-commerce, requiring a mutual authentication between a user and a service provider, among a plurality of providers to which this user has an account. Such authentication is required each time the user wants to access to the service of the provider. In particular, the invention provides a solution for securely managing access to a plurality of services (each of them being provided by a specific service provider) by means of one authentication device which avoids the user to retrieve, by himself, both the "user ID" and the related password which are specific to each account. The present invention also refers to the authentication device for carrying out this method.

BACKGROUND ART

Thanks to world wide network (Internet), today a common user has access to a great number of providers suggesting different services such as e-banking, e-commerce, e-booking, or any other electronic services. Service providers can be merchants, organizations or any other entities. Depending on the nature and the importance of certain data exchanged between a service provider and a user (also called subscriber), the latter has to identify himself to the provider by providing a specific so-called "user login" (or "user ID") and the related password.

As the number of login and passwords to remember is so lame, most users either use the same password everywhere or they write them on a paper in order to be sure to retrieve them later. These ways of doing do not allow meeting the initial security goals sought by such authentication which can then be compromised. Moreover, to reach a good security level, passwords should be changed, each according to different periods of time or other rules, for preventing users to use the same passwords during a long time period or for several applications.

As example, within the field of e-banking, it is known that the user has to login to his account by means of an access card and a card reader which is independent to the personal computer through which the data can be exchanged between the user and the service provider. To this end, the user has to insert the access card into the card reader and enter his PIN code using the keypad on the card reader. Then, he enters his user ID (user login) in the login window on his computer screen. He receives a number, from the service provider, which be entered on the card reader. In reply, a one-time password appears on the screen of the card reader. The user has to enter this password in the password field on his computer, if all data entered both in the card reader and in the computer are correct, then the user is successfully authenticated and he gets access to the service of the provider, for instance for performing banking transactions or for consulting his bank accounts.

However, such a system provides access to one service only. Each service provider needs its own access card which requires a specific card reader. Moreover, card readers cannot be shared with the access cards of other service providers. Thus, the user wanting to have access to services provided by several providers must have, for each service provider, an access card and the related access card reader. This way is on the one hand not convenient for the user and on the other hand not rational from both an economical and ecological point of view.

Therefore, there is a need for improving the management of user identifiers and passwords required for authentication processes, between a user and a plurality of service providers to which this user is registered, by means of an authentication device such as an access card.

SUMMARY

In order to solve the above-mentioned problem, the present invention aims to provide a solution for managing access to a large number of services, each one requiring a specific login and password. Preferably, the latter must meet specific robustness constraints and potential renewal intervals imposed by the service provider to minimize piracy risks, in particular, the invention suggests a method for authenticating a user to a service provider, among a plurality of services providers each having a user account for this user. This method uses a single authentication device identified by a unique device identifier. This method comprises the steps of:

transmitting, from the authentication device to the service provider, an authentication request comprising at least said device identifier, preparing, by the service provider, provider authentication data on the basis of pairing data shared by both said authentication device and said service provider, sending said provider authentication data from the service provider to the authentication device, authenticating at the authentication device said provider authentication data; in case of positive outcome, then preparing device authentication data based on any of said pairing data by the authentication device, then sending said device authentication data to the service provider, verifying the authenticity of the device authentication data by the service provider and in case of positive outcome, then validating the authentication of said user, wherein said authentication device comprises a provider record for each of said service providers with whom the user is registered by having a user account, each provider record comprises a pairing key KP and first data, said pairing key KP and said first data being shared with the service provider to which said provider record refers, said provider authentication data comprises a first cryptogram obtained by encrypting said first data with said pairing key KP, authenticating said provider authentication data is performed at the authentication device by the steps of:

decrypting said first cryptogram by means of the pairing key KP stored in one of said provider records, then comparing the result of this decryption with first data resulting from pairing data stored in said provider record, if the comparison does not indicate a match, then processing again the previous decryption and comparison steps by using the pairing key KP of another provider record until each of said provider records stored in the authentication device has been processed.

The authentication device is a secure cryptographic device. Preferably, the authentication device is in the form of a smart card (access card).

According to a first embodiment, the authentication device is not connected to the service provider and data exchanged between the user and the service provider are sent and received by means or a terminal, typically a personal computer within a home environment. Alternatively, the authentication device can be provided with wire and/or wireless communication means (e.g. wireless short range connection means such as Near-Field Communication) for exchanging data with the service provider via the terminal.

According to another embodiment, the authentication device is a communication device, preferably a portable computing device such as a smartphone, a tablet computer, a personal digital assistant, a laptop, etc. . . . , in which a secure software application has been installed or implemented for processing the method of the invention. This portable computing device can be linked to the service provider either directly or via the above-mentioned terminal, in the case where it is directly connected to the service provider, the authentication device can be provided with longer range communication means, such as the means provided in the mobile phones.

As the authentication device of the present invention is able to manage itself a plurality of account registrations to several service providers (by means of records stored in the authentication device), the user would simply enters (in the terminal or directly in the authentication device in case the latter is provided with communication means), data requested by the authentication device.

To further facilitate the login process, the required data exchanged with the service provider can be automatically handled by the authentication device if this device is provided with communication means for exchanging data either directly with the service provider or via a terminal.

The present invention is not limited to the above-mentioned method, but also relates to the authentication itself. Thus, the invention also refers to an authentication device for authenticating a user to a service provider, among a plurality of service providers, comprising:

a unique device identifier,
a non-volatile secured memory for storing secret and/or shared data,
a user interface for user data input,
a display,
a crypto-processor for performing cryptographic and logical operations and for managing functions and all components of the authentication device.

According to the invention, the memory is organized for storing, in an orderly manner (and within records), data relating to a plurality of service providers and the crypto-processor is able to retrieve data relating to each of these service providers for processing them in a distinct manner.

Other advantages and embodiments will be presented in the following detailed description.

BRIEF DESCRIPTION OF THE DRAWINGS

The present invention will be better understood thanks to the attached figures in which.

DETAILED DESCRIPTION

Figure 1:
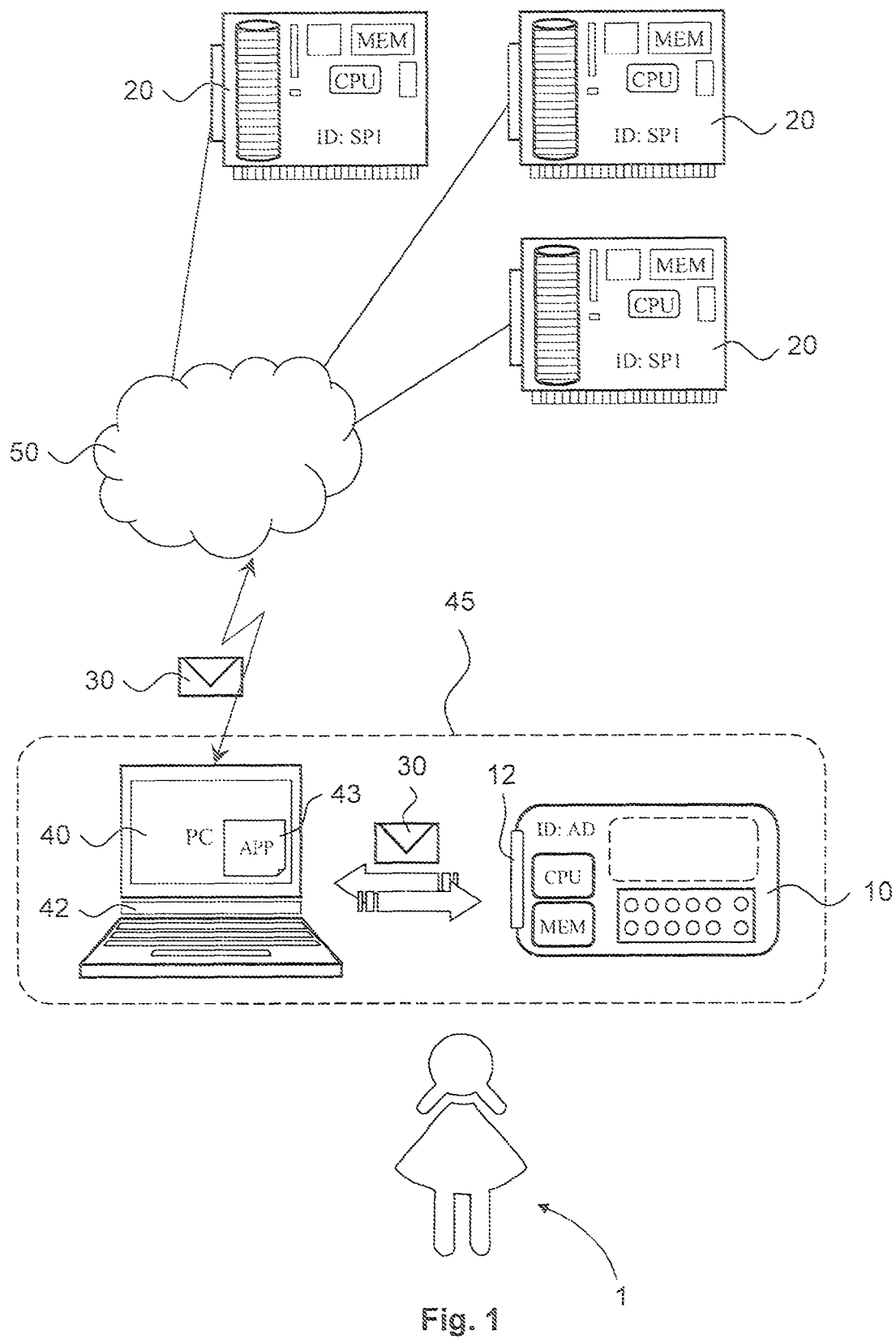
FIG. 1 is a block diagram depicting an overview of the main devices involved in the method of the present invention.

Referring to FIG. 1, the latter shows an overview of the system relating to the method of the present invention. This method aims a mutual authentication between a user 1 and a service provider 20 among a plurality of service providers. The user is registered to each of these service providers, e.g. by means of a user account. Only three providers are represented in the example of FIG. 1 but it should be understood that more providers will be generally involved. According to the invention, this mutual authentication is carried out by means of an authentication device 10 shown in the figures in the form of a smart card. In order to authenticate both the user 1 and the service provider 20 with whom the user wants to have an access, data 30 has to be exchanged between these two entities. According to one embodiment, such a data exchange is performed via a terminal 40, typically a personal computer within a home environment 45. To this end, the terminal 40 is firstly provided with at least one communication interface 42, for exchanging data at least with anyone of the service providers 20 through a network 50 (e.g. internet), and secondly with a software application 43 for performing some steps of the present method. According to another embodiment, the authentication device 10 could be considered as being secure software installed within the terminal 40 or within any other communication means such as smart phone, tablet computer, laptop etc. . . . Accordingly, the authentication device 10 could be able to directly exchange data 30 with the service provider 20. According to a further embodiment, the authentication device 10 could be also provided with its own communication interface 12 for exchanging data with the terminal 40 through a wire (e.g. USB) or wireless communication (NFC, Bluetooth, Infrared, etc. . . . ), preferably a short range wireless communication. Data exchanged between the authentication device 10 and the terminal 40 could be also achieved via an intermediate device (not shown in the Figures) supporting one of these technologies. For instance, such an additional device could be a card reader in case the authentication device 10 is in the form of an access card.

Figure 2:
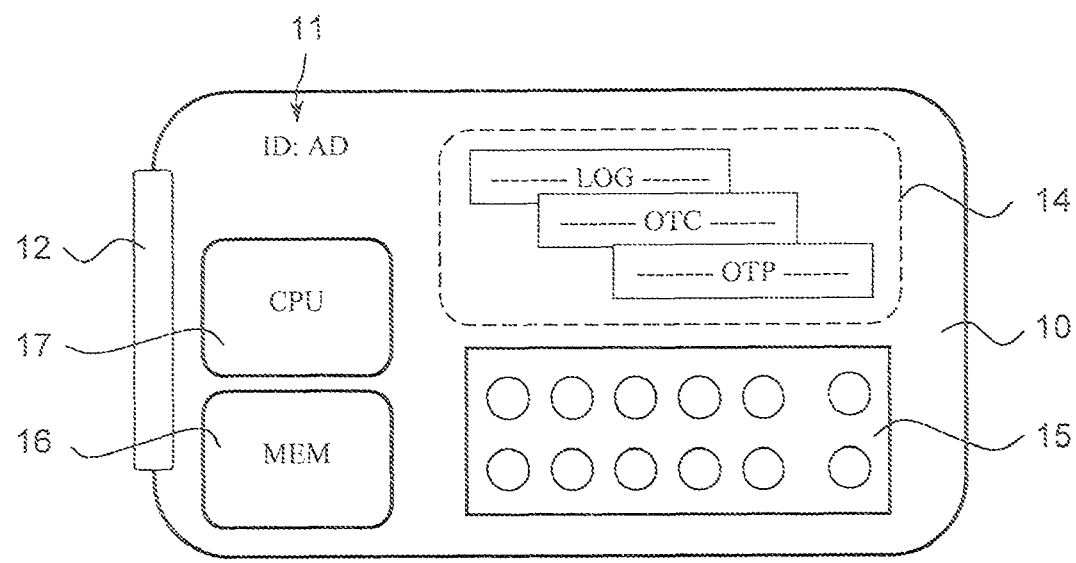
FIG. 2 is a schematic enlarged view of the authentication device according to a preferred embodiment.

FIG. 2 is a schematic enlarged view of an authentication device 10. According to as preferred embodiment, this device 10 is a smart card provided with a display screen 14 and a user interface 15 such as a keypad. The authentication device is identified by a unique device identifier 11 typically a card number printed on the card. This device identifier 11 could be stored in a memory 16, preferably a non-volatile secured memory which is also used for storing other data, such as keys, shared data or PIN code (personal identification number). According to the preferred embodiment, the communication interface 12 is NFC compliant. The authentication device also comprises a crypto-processor 17 for performing cryptographic and logical operations, on the one hand, and for managing all components of the device 10, on the other hand. Cryptographic operations typically refer to encryption/decryption processes, execution of hash functions for providing digests and to execution of algorithms e.g. for determining challenges or cryptographic results.

Figure 3:
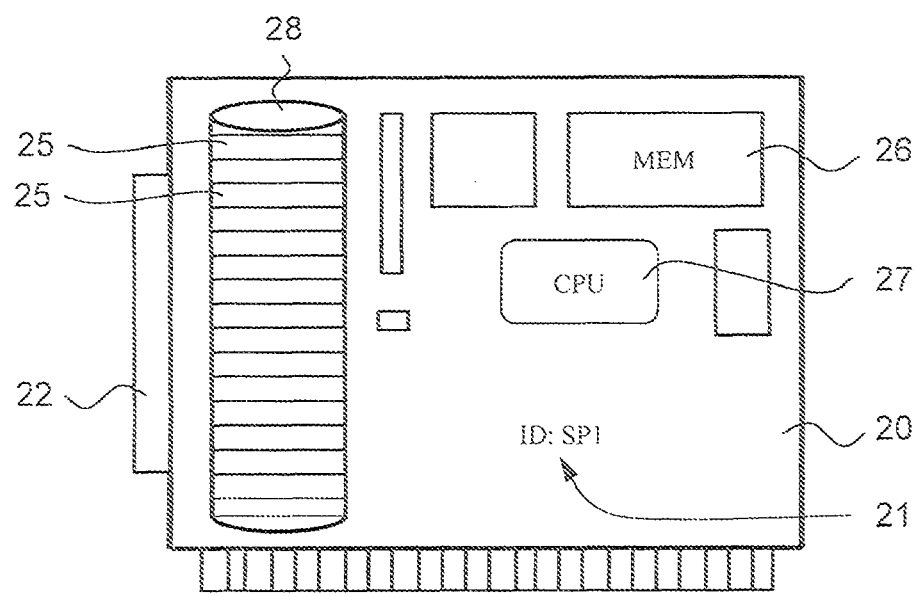
FIG. 3 depicts a schematic enlarged view of one of the service providers.

FIG. 3 shows the main components of one of the service providers 20. Each of them is identified by a unique provider identifier 21 and comprises at least a communication interface 22 for exchanging data (either with the terminal 40 or directly with the authentication device 10), a non-volatile memory for storing any kind of data, a database 28 for storing a plurality of user accounts 25 belonging to registered users benefiting from the services of this service provider and a crypto-processor 27 for managing all the components of the service provider and for performing cryptographic and logical operations.

Figure 4:
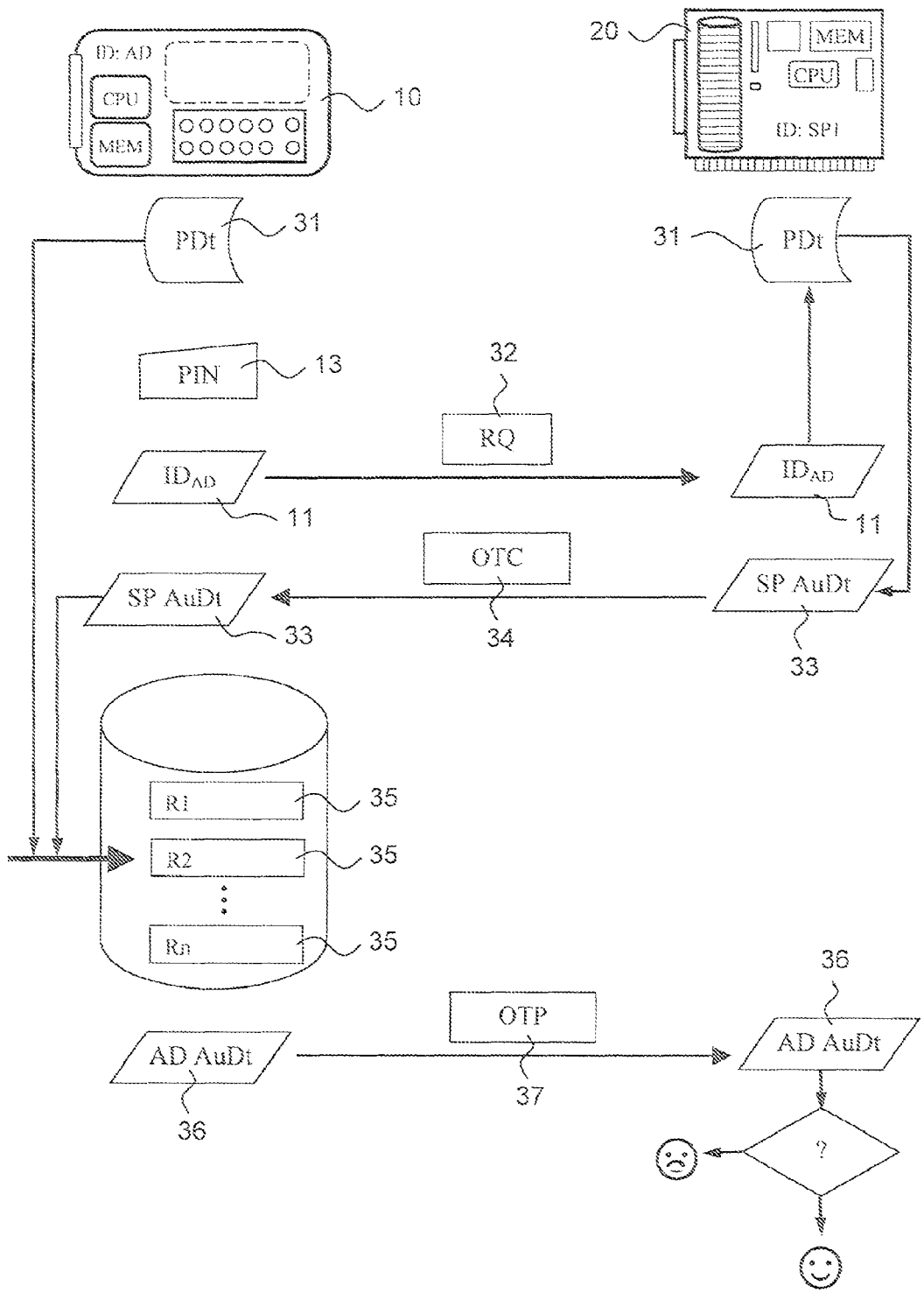
FIG. 4 is a flowchart showing data exchanges between the authentication device and the service provider.

Referring now to FIG. 4, the main steps of the method are illustrated in a flowchart showing data exchanges between the authentication device 10 and one of the service providers 20. The authentication device and the service provider comprise pairing data 31 which can result (at least partially) from a pairing process performed during a registration phase where a new account is created for each new user wanting to join a new service provider. Thus, pairing data may comprise pairing keys and/or any shared data, functions or algorithms known both by the authentication device and the service provider. At the user side, pairing data are stored in the secure memory 16 of the authentication device, whereas at the provider side, pairing data 31 are preferably stored in the database 27, in particular in the user accounts 25 stored in this database. According to a preferred embodiment, the access to the authentication device is protected by a Personal identification Number known by the user only. Such a PIN code 13 aims to prevent any fraudulent use of the authentication device by other persons than the card owner (mentioned here as being the user). When the user power on the authentication device, the latter ask him to enter the PIN code. If the PIN code entered by the user does not correspond to a reference PIN code stored in the secured memory 16, then the access to the authentication device is refused. The user can have for instance three attempts to enter the PIN code. After entering the PIN incorrectly a third time, the access to the authentication device can be permanently locked and the user has to contact the service provider either for replacing the authentication device or for unlocking it.

The first step of the method refers to the transmission of an authentication request 32 from the authentication device 10 to the service provider 20. This request comprises at least the device identifier 11 so that the authentication device can be identified by the service provider. The device, identifier 11 allows seeking into the provider database 28 to find the corresponding pairing data 31 for said user. This can be done through the user account 25, each comprising the related device identifier 11. In case that the device identifier 11 is unknown (i.e. cannot be found), the authentication is aborted.

Then, the service provider has to authenticate to the authentication device 10. To this end, it prepares provider authentication data 33 on the basis of current pairing data 31 shared by the two involved entities. For example, this pairing data can be based on the identifiers of these entities or any other shared information such as timestamps, counters, or random seeds. Such information could be placed e.g. in a metadata field included in the provider authentication data 33 or attached to the provider authentication data while being considered as being part of this data 33. Then, the service provider 20 sends the provider authentication data 33 to the authentication device 10, preferably in the form of a one-time code (OTC) 34.

For each service provider 20 with whom the user is registered e.g. by having a user account 25, the authentication device 10 has created, for its part, a provider record 35 in its memory. Once the provider authentication data has been received, the authentication device must authenticate provider authentication data. To this end, it has firstly to identify one provider record 35 among a plurality of provider records stored in its memory, more particularly among at least one provider record 35 in the case where the user is not yet registered with more than one service provider 20. The authentication of the relevant provider record in the memory of the authentication device is performed on the basis of data comprised in the provider authentication data 33 sent by the service provider 20. The authentication of the provider authentication data is based on the pairing key KP shared between the authentication device 10 and the service provider 20. In case that the authentication device 10 is able to find one paring key KP that is able to validly authenticate the provider authentication data, the authentication device 10 considers that the provider authentication data are valid.

Provider authentication data allows the authentication device to point the provider record 35 either directly, for instance in the case where the service provider is directly identifiable from the provider record, or indirectly, for instance by means of a correspondence table. Such a correspondence table could list the provider identifiers 21 of all the service providers to which the user is registered and it could provide the corresponding numbers of each provider record 35 as stored in the memory 16.

In reply to the successful authentication of the service provider, the authentication device 10 prepares, at its turn to the service provider 20, device authentication data 36 preferably based on the pairing key KP shared between the authentication device 10 and the service provider 20. Then, device authentication data 36 is sent to the service provider, preferably prepared in the form of a one-time password (OTP) 37. Similarly, as cited above with reference to provider authentication data 33, device authentication data 36 can be based on any of pairing data 31, including aforementioned metadata. Once device authentication data 36 is received by the service provider 20, the latter can verify the authenticity of the device authentication data and, in case of positive outcome, it can validate the authentication of the user 1.

According to the present invention, the authentication device comprises a provider record 35 for each of the service providers 20 with whom the user 1 is registered by having a user account 25. Each provider record 35 comprises a pairing key KP and first data. The pairing key KP and first data correspond to pairing data 31 as they are shared with the service provider to which said provider record refers.

Provider authentication data 33 comprises a first cryptogram obtained by encrypting first data with the pairing key KP. First data may result at least from one of pairing data 31, for instance from the provider identifier 21, from the device identifier 11 or from a root value known both by the authentication device 10 and by the service provider 20. First data can also derive or result from at least one of pairing data 31 (i.e. without being directly one of said pairing data), for instance by means of a shared function having the root value and/or the provider/device identifier as input. First cryptogram could represent a digital signature by applying a hash function (or any other one-way function) onto first data, in particular one of pairing data (e.g. the provider identifier 21) to obtain a digest which can be further encrypted by means of the pairing key KP. Thus, the first cryptogram could correspond to the digital signature of the service provider.

The root value could correspond to a secret value that has been stored in the secure memory 16 of the authentication device during its manufacturing or at least before it is delivered to the user 1 (thus before the first use of the authentication device by the user). Such a root value could be identical to all authentication devices 10 or specific to each device 10 or to a certain number of authentication devices 10. In any case, the service provider has to be able to retrieve the relevant root value of the relevant authentication device as pairing data 31, in a similar way as for the pairing key KR in the authentication device 10, the pairing key KP is stored in the relevant provider record 35 given that the pairing key KP differs from one service provider to another. The same is done for the root value. However, in the case where the root value is common to all authentication devices, this root value can be stored as pairing data in the secure memory 16, avoiding thus to be repeated in each provider record 35.

The authentication of provider authentication data can be performed at the authentication device by the following steps:
  decrypting the first cryptogram by means of the pairing key KP of one of the provider record 35 to obtain decrypted first data (e.g. the first provider record stored in the authentication device), then
  comparing the decrypted first data resulting with first data part resulting of the pairing data stored in the relevant provider record 35 for with first data stored elsewhere in the authentication device 10, for instance in the secure memory 16),
  if the comparison does not indicate a match, then processing again the previous decryption step by using the pairing Key KP of another provider record (e.g. the next one) until each provider record 35 stored in the authentication device 10 has been processed.

For example, the authentication device 10 seeks to login with the third service provider SP3 and thus has to identify the provider record R3 among Rn records stored in its memory. Each of these provider records comprises a specific pairing key K?, so the record R1 comprises the pairing key KP1, the record R2 comprises the pairing key KP2, etc. . . . In the present example, the pairing key KP used by the service provider for encrypting the first cryptogram received by the authentication device 10 is KP3. According to an initial protocol, the authentication device 10 knows in advance which kind of data has been encrypted by the service provider 20. For instance, it knows that the first cryptogram is based on the encryption of the provider identifier 21. However, the authentication device 10 has no means to know which service provider is the sender of the first cryptogram. Thus, the authentication device tries to decrypt the first cryptogram with the pairing key KP1 of the first provider record R1. Then, the authentication device 10 compares the result of this decryption with expected data, namely in this example the provider identifier 21 ($ID_{SP1}$) stored in the provider record R1. If the decryption result does not match with the identifier $ID_{SP1}$, then the authentication device process again with another provider record 35, typically with R2. Given that the comparison of the result of the decryption (performed by the authentication device) with the second pairing key KP2 (stored in the second provider record R2) does not match with the provider identifier $ID_{SP2}$ stored in this record R2, the authentication device concludes that the cryptogram does not come from the second service provider SP2. Once the authentication device will have tested pairing data stored in the third provider record R3, the comparison will indicate a match and the identification/authentication will be successfully achieved. In the case where the pairing key KP is a shared key used within a symmetric cryptographic scheme, the authentication device 10 may also encrypt the provider identifier of a provider record by means of the pairing key stored in this record and may compare the result of this encryption with the first cryptogram received from the service provider, it should be noted that the cryptographic algorithm (or any other function) used by the authentication device must be the same as that used by the service provider in order to retrieve the same results.

Instead of using the provider identifier 21 as first data of the first cryptogram, one can use e.g., an expected shared value, the device identifier 11, a challenge or any other data that the authentication device 10 knows it must retrieve and knows how to do it. Besides, first data is not limited to one data, but may include or be based on several data, among said pairing data 31.

Depending on the embodiments of the present invention, the transmission of the authentication request 32 can be achieved according to several ways. In the case where the authentication device 10 is not provided with a communication interface 12 for exchanging data with the service provider 20, the authentication device can firstly display the authentication request 32 (e.g. in the form of one or several alphanumeric characters strings). Then, the user 1 enters manually the displayed authentication request 32 in the terminal 40, in particular in an appropriate field displayed on the computer screen by the software application 43 installed in the terminal 40 for at the provider side). Finally, the terminal sends the entered authentication requests to the relevant service provider 20 by means of the software application 43.

According to another embodiment, the authentication request 32 could be automatically sent to the terminal device 40 without any manual intervention of the user. Such data exchange will transit through the communication interfaces 12 and 42 of the authentication device 10, respectively of the terminal 40. The authentication request 32 will be forwarded by the terminal 40 to the relevant service provider 20 via the network 50 and through the respective communication interfaces 42 and 22. According to as further embodiment, in particular in case the authentication device 20 refers to software application installed in a communication device such as a smart phone or a tablet computer for instance, the authentication request 32 can also be automatically sent from the authentication device 10 to the service provider 20.

The same ways as those described above can be performed in the reverse direction for receiving device authentication data 33 from the service provider 20 (e.g. via a one-time code 34). In the case where the authentication device 10 is not provided with a communication interface 12 for exchanging data with the terminal 40 (or directly with the service provider), then the OTC 34 could be displayed by the computer screen of the terminal 40 before to be manually entered by the user 1 into the authentication device 10 (via the user interface 15).

By using same pairing data and the same function (or the same algorithm) for preparing provider authentication data 33 to send to the authentication device, this provider authentication data 33 will never change from one login to another. Thus, it should be useful to diversify the messages (codes) exchanged between the service provider and the authentication device in view to reduce piracy risks. This can be achieved by including, in the exchanged data, a first challenge which can be identified by the recipient. For instance, provider authentication data 33 may comprise a first challenge in the form of a random number (generated and added by the service provider), e.g. having a certain number of digits. If the recipient (i.e. the authentication device) knows that provider authentication data comprises or has been mixed with a random number and knows how to identify this random number, therefore it will be able to extract the first challenge from the provider authentication data. The first challenge can be added to the first data prior to the encryption by the pairing key KP. At the reception by the authentication device, the decryption of the cryptogram by the pairing key will thus obtain the combination of the first data and the challenge. The challenge is then extracted to obtain the first data.

By including such a first challenge in provider authentication data, data sent by the service provider to the authentication device typically correspond to the so-called one-time code (OTC) 34. One-time codes and/or one-time passwords avoid replaying the same code/password, reducing the chances of success of a "man in the middle" attack, preventing phishing and any cloning of the authentication device.

The first challenge can be already part of pairing data, or can be considered as being part of such data in case it can be retrieved from one or some pairing data or from a shared protocol, for instance based onto a counter synchronized both at the sender and at the recipient. In this case, provider authentication data 33 could comprise only a provider signature based on the first challenge.

According to another embodiment, the step of preparing and sending device authentication data can be achieved under certain conditions only. For instance, this step can be performed if the verification, by the authentication device, of provider authentication data by means of pairing data stored by the authentication device provides a positive outcome.

In the case where the provider authentication data is a signed provider message which comprises the provider identifier 21 and the digital signature of this provider applied to its provider identifier (by means of a one-way function and the pairing key KR, so that e.g. the provider message={$ID_{SP}$; [hash($ID_{SP}$)]$_{KP}$}), then the authentication device 10 must verify the authenticity of the message received from the service provider after having identified the provider record 35 to which the provider identifier refers. Identifying the provider record can be performed by sequentially comparing the provider identifier of the received message with each identifier of the pairing data stored in the authentication device until a match. Then, verifying the authenticity of the message received from the service provider can be achieved by:
- decrypting the provider digital signature by means of the pairing key KP of the identified provider record 35,
- comparing the result of this decryption with a digest calculated (by the authentication device) by means of the one-way function applied onto the provider identifier 21. If there is as match, the service provider has been successfully authenticated by the authentication device.

Instead of applying the signature onto the provider identifier 21 in the aforementioned signed provider message, one could applying the signature onto another pairing data such as a shared value, the device identifier, the first challenge or a second challenge as disclosed later.

In a variant, the pairing key KP can be determined both by the service provider and the authentication device instead of being merely retrieved from a memory by each of these entities, e.g. by extracting it from the database 28, or from a provider record 35. For that purpose, the service provider can comprise a provider key Kpp which is the result of a one-way function of a root key KR parameterized by the provider identifier $ID_{SP}$ 21. In other words, one can write; Kpp=$f_1$(KR; $ID_{SP}$). The root key KR has been previously stored in the authentication device, for instance in the secured memory 16 during the manufacturing of the authentication device or at least before it is delivered to the user 1 (thus before the first use of the authentication device by the user).

The pairing key KP is calculated by the service provider 20 as being the result of a one-way function of the provider key Kpp parameterized by the authentication device identifier 11, so that KP=$f_2$(Kpp; $ID_{AD}$).

From the other side, the (same) pairing key KP is calculated by the authentication device 10 as being the result of a one-way function of the root key KR parameterized by the provider identifier 21 and by the device identifier 11, so that KP=$f_3$(KR; $ID_{SP}$; $ID_{AD}$). The first one-way function $f_1$ can be identical or different from the second one-way function $f_2$. The third one-way function $f_3$ results from a combination of the two other functions. Indeed, given that the authentication device 10 knows the root key KR which has been used by the service provider for determining its provider key Kpp, therefore the authentication device is also able to calculate this provide; key Kpp=$f_1$(KR; $ID_{SP}$), because it already knows the provider identifier $ID_{SP}$. Then, by means of the provider key Kpp and its own device identifier $ID_{AD}$, the authentication device is further able to calculate the pairing key KP=$f_2$(Kpp; $ID_{AD}$). Of course, the service provider and the authentication device have to use the appropriate functions $f_1$, $f_2$, $f_3$ (which can be shared in advance). Advantageously, data of messages exchanged between the authentication device and the service provider can be encrypted/decrypted by means of a pairing key KP which is not merely extracted from a memory, but which has to be firstly determined by each entity before handling these messages. This way of doing allows increasing the security of the data exchange system.

According to another variant, the pairing key KP could be used for determining a session key KS which could be then used for encrypting/decrypting data (or messages) sent between the service provider and the authentication device 10. In other words, the pairing key KP could be regarded as being an intermediated pairing key and the session key KS as being the (final) pairing key. Therefore, once determined, the session key KS could be used as encryption key both in the provider authentication data 33 and in the device authentication data 36, instead of the pairing Key. The session key KS can be determined, separately, by the sender and by the recipient, on the basis of shared data such as the pairing key KP, a shared function and a challenge for instance. For example, the session key KS could be determined (at each side) as being the result of a XOR function having both the pairing key KP and a challenge CH as operands, so that KS (KP XOR CH). Such a challenge could be the second challenge. Of course another function or even a synchronized counter could be also used instead of such a logical function (logical operation).

According to another variant, the pairing key KP may be also determined, separately, by the sender and by the recipient, on the basis of a Diffie-Hellman key exchange. To this end, the authentication device 10 and the service provider 20 comprise: a shared value, the provider identifier 21 and the device identifier 11 as pairing data 31. The pairing key KP can be determined at each side by raising said shared value to the power of the product of the provider identifier 21 and the device identifier 11.

In variant:
- the shared value can be the root key KR,
- the authentication device 10 comprises a device key Kpd (stored in its secured memory 16) which is the result of the root key KR raised to the power of the device identifier $ID_{AD}$, so that Kpd=$KR^{ID_{AD}}$,
- the service provider 20 comprises a provider key Kpp which is the result of said root key KR raised to the power of provider identifier $ID_{SP}$, so that Kpp=$KR^{ID_{SP}}$.
- the pairing key KP can be determined at the authentication device 10 by raising the device key Kpd to the power of the provider identifier $ID_{SP}$, so that KP=$Kpd^{ID_{SP}}$=$KR^{ID_{AD}*ID_{SP}}$,
- this pairing key KP can be determined at the service provider 20 by raising the provider key Kpp to the power of the device identifier $ID_{AD}$, so that $KP=Kpp^{IDAD}=KR^{IDSP*IDAD}$.

This way of doing can be also be improved by using a modulo function applied to Kpp and Kpd, as well known by the person skilled in the art.

Besides, it could be useful to normalize the length of the provider identifier 21 and/or the length of the device identifier 11 to a certain number of digits or bits defined as a standard for all service providers 20. To this end, the letters (and/or each authentication device) could be provided with a function will allow e.g. to extend the length of the identifier to a predefined length before using this identifier in further operations.

In a further variant, the pairing key KP could be regarded as being either a private key or a public key in the case where these two last keys form a pair of keys, according to an asymmetric encryption scheme. In such a scheme, one should consider whether the pairing key KP is used for encrypting data by a sender or whether it is used for decrypting data by the recipient. Indeed, in such a scheme:

the pairing key KP used by the authentication device 10 for encrypting data is a public provider key Kup, whereas if this pairing key KP is used by the device 10 for decrypting data, then KP will be considered as a device key Kpd, in particular as a private device key;

similarly, the pairing key KP used by the service provider 20 for encrypting data is a public device key Kud, whereas the pairing key KP used by the service provider 20 for decrypting data is a provider key Kpp, in particular a private provider key.

Accordingly, (Kpd; Kud) form a first pair of keys belonging to the authentication device 10, and (Kpp; Kup) form a second pair of keys belonging to the service provider 20. Therefore, the aforementioned data can be exchanged in an encrypted form between these two entities.

According to a further embodiment, the authentication request 32 can further comprise a second challenge generated by the sender, namely by the authentication device 10, and identifiable by the recipient, namely by the service provider 20. The use of this second challenge could be similar to the use of the first challenge described above. In both cases, the sought purpose is to avoid replaying same data in the messages exchanged between the service provider and authentication device, by generating one-time requests 32, one-time codes 34 and one-time passwords 37. Accordingly, such a second challenge could be also included in the provider authentication data 33, for instance as being data used by the service provider for generating its digital signature.

Whatever the embodiment, the above-mentioned method can be regarded as referring to a user login phase for login the user 1 with one of the service providers 20 recognized by the authentication device 10. Accordingly, the present method can comprises an account registration phase performed by each user 1 wanting to join a new service provider 20. It should be understood that the account registration phase is performed only one time with each service provider 20, before the user performs for the first time the user login phase with this service provider.

According to one embodiment, the account registration phase comprises the steps of:

sending the device identifier 11 from the authentication device 10 to the service provider 20, generating, by the service provider 20, a provider message comprising at least the provider identifier 21 and a provider signature of said at least provider identifier 21, said signature being encrypted by a first key which can be a public provider key Kup or a pairing key KP determined on the basis of a shared protocol, sending said provider message to the authentication device 10, verifying, at the authentication device 10, that said provider message is authentic and in positive outcome, then adding a provider record 35 assigned to the service provider 20 and storing at least a part of data comprised in said provider message as pairing data 31 in the authentication device 10; data stored as pairing data can be typically the provider identifier 21 and the pairing key KP, preparing, at the authentication device 10, a response comprising at least the device identifier 11 and a device signature of said at least device identifier 11, said signature being encrypted by a second key which can be a public device key Kud or the shared pairing key KP, then sending this response to the service provider 20, verifying, at the service provider 20, that said response is authentic and in positive outcome, then creating in a database 28 of the service provider 20 a user account 25 for storing said pairing data 31, typically the device identifier 11 and the shared pairing key KP.

The provider digital signature has been determined by calculating a first digest (e.g. by using the provider identifier as input of a one-way function), then by encrypting this first digest with the pairing key KP.

Verifying that the provider message is authentic is performed by verifying the authenticity of the provider digital signature. To this end, the authentication device 10 performs the steps of:

calculating a second digest of said signing data (included in the provider message) by means of the above-mentioned one-way function, decrypting the provider signature by means of the first key;

comparing the second digest with the first digest, and if the comparison provides a match then performing the next steps.

In the case where the first key is a public key, this public key can be authenticated by means of a digital certificate containing this public key and a signature of a trust certificate authority.

Verifying that the response received by the service provider is authentic can be performed by the same mechanism as that performed by the authentication device for verifying that the provider message (in particular the provider signature) is authentic.

The one-way functions cited in the present description could refer typically to the cryptographic hash functions SHA-1, SHA-2 or SHA-3. However, the one-way functions used in the invention are not limited to these examples.

Advantageously, owing the present invention, the user can use the same authentication device 10 for accessing to services of several service providers 20. For the user, the login data (user login and password) required to access to service providers appears as being always the same although it is not the case since the task of the authentication device of the present invention is to retrieve the appropriate authentication data (keys, passwords or user logins) relating to each service provider. Accordingly, login operations are greatly simplified for the user since he has the feeling to have a universal password (and a universal user ID). In the same time, the invention provides a fully secure solution for performing mutual authentications each time the user want to have access to a service provider which requires entering a user ID and the related password. Thus, the authentication device is able to authenticate one service provider (among several service providers) and the service provider is able to authenticate the user, making sure there are no clones or replays of login sessions.

Moreover, by providing the authentication device with a communication interface for exchanging data with the service provider (either directly, or is a terminal), the use of the present invention becomes even easier for the user, since all data exchange are automated. The authentication device can store a large number of provider records 35 and therefore is able to give the user access to many service providers anywhere, in a really easy manner.

Besides, the implementation of the present invention is also very easy, in particular within a home environment when the user has to connect to the service provider via a personal computer or any similar device (tablet computer, personal digital assistant, laptop, etc. . . . ). For instance, the login page of the Internet site of the service provider must be merely adapted to suggest to the user a login via the authentication device of the invention. The user could have just to select the appropriate login means and then the software application (installed in the computer at the user side or at the server side) will be able to process the authentication according to the method of the present invention. Moreover, by using the NFC technology (or any other wireless short range connection), data exchange between the terminal 40 and the authentication device 10 are secured enough, in particular within a home environment.

The subject-matter of the present invention also refers to the authentication device 10 used for performing the above-mentioned method. In particular the present invention refers to an authentication device 10 for authenticating a user 1 to a service provider 20, among a plurality of service providers 20, comprising:

a unique device identifier 11,
a non-volatile secured memory 16 for storing secret and/or shared data,
a user interface 15 for user data input,
a display 14,
a crypto-processor for performing cryptographic and logical operations and for managing functions and all components of the authentication device 10.

According to the invention, this authentication device 10 is characterized in that:

the memory 16 is organized for storing specific data relating to a plurality of service providers 20, and
the crypto-processor 17 is able (i.e. programmed) to process with said plurality of service providers 20 in view of retrieving data relating to each of these service providers and processing them in a distinct manner.

In particular, the memory 16 is organized for efficiently retrieving data referring to several service providers. This can be achieved by ordering data relating to each of these service providers in specifics, records, in particular in the provider records 35 shown in FIG. 3.

According to one embodiment, the authentication device 10 further comprises a communication interface 12 for data exchange. This interface can be a wireless short range communication interface, such as an infrared or Bluetooth interface, preferably a NFC interface (Near-Field-Communication). Alternatively, the communication interface can be a wire interface, e.g. an USB port.

According to a preferred embodiment, the user interface 15 is a keypad provided with several buttons, typically buttons corresponding to numbers 0-9 and at least one so-called "enter" or "OK" button, one "clear" button and one "on/off" button. Of course, other buttons such as a decimal point or alphabetic buttons could be also included. Such a keypad is typically used by the user for entering its user login and codes provided by the service provider. However, it could be also used by the user for entering a personal identification number (PIN code), preferably just after the activation of the authentication device for providing its full access. According to another embodiment, the user interface 15 could be a biometric sensor such as a fingerprints sensor, a micro-camera or a voice sensor for acquiring biometric data (i.e. features) of the user (such as fingerprints, an iris picture, the shape of the user's face, hands or veins geometry, user's voice). In this case, such a biometric sensor would be only used for authenticating the user to the authentication device 10.

Preferably, the device identifier 11 will be printed onto the authentication device 10 so that there is no risk for the user 1 to loose it. Still preferably, the device identifier 11 is stored in the memory 16 of the authentication device.

According to a preferred embodiment, the authentication device 10 is a smart card as schematically shown in FIG. 2. The memory 16 and the crypto-processor 17 can be embedded in a single chip set, for instance in a monolithic chip, so that data stored in the authentication device are physically protected against any malicious person. The crypto-processor comprises cryptographic computing capabilities to calculate passwords and process numbers for verifying the validity of an existing account (in reference to provider records) or for adding a new account (provider record).

According to another embodiment, the authentication device can be in the form of software application that could run securely on hardware (PC, or any portable computing or communication device).

Advantageously, the authentication device 10 of the present invention is not only able to manage several accounts (provider records) of service providers, but it is also able to develop its capabilities by adding new accounts providing access to new service providers. This becomes possible owing to the account registration phase which has been already disclosed above. Inversely, the user should be also able to cancel accounts (provider records) for which he has no longer interest.

Still advantageously, by providing the authentication device 10 in the form of a smart card with a display 14 and a user interface 15 for inputting data, such a device 10 becomes autonomous (self-governing) and does not require any more to be inserted into a card reader before to be used for authentication purposes. Accordingly, all service providers will find a predominant economic interest and both the user and the service providers will be winners.

The invention claimed is:

1. A method for authenticating a user to a service provider, said method using a single authentication device identified by a device identifier and comprising the steps of:

transmitting, from the authentication device to the service provider, an authentication request comprising at least said device identifier;
preparing, by the service provider, provider authentication data on the basis of pairing data shared by both said authentication device and said service provider;
sending said provider authentication data from the service provider to the authentication device;
authenticating at the authentication device said provider authentication data;
in response to a positive authentication of the provider authentication data, preparing device authentication data based on any of said pairing data by the authentication device, and sending said device authentication data to the service provider; and verifying the authenticity of the device authentication data by the service provider and in response to a positive authentication of the device authentication data, validating the authentication of said user;

wherein said service provider is selected from among a plurality of service providers with whom the user is registered by having a user account, and said authentication device comprises a provider record for each of said plurality of service providers, each provider record comprises a pairing key and first data, said pairing key and said first data being shared with the service provider to which said provider record refers;

said provider authentication data comprises a first cryptogram obtained by encrypting said first data with said pairing key; and authenticating said provider authentication data is performed at the authentication device by the steps of decrypting said first cryptogram by means of the pairing key stored in one of said provider records;

comparing the decrypted first cryptogram with first data resulting from pairing data stored in said provider record;

if the comparison does not indicate a match, then repeating the previous decryption and comparison steps by using the pairing key of another provider record until each of said provider records stored in the authentication device has been processed.

2. The method of claim 1, wherein said provider authentication data is a one-time provider authentication data and/or said device authentication data is a one-time device authentication data.

3. The method of claim 2, wherein said provider authentication data further comprises a challenge identifiable by the authentication device.

4. The method of claim 1, wherein said first data results either from a provider identifier or from a root value, said provider identifier or said root value being stored as pairing data both at the authentication device and at the service provider.

5. The method of claim 1, wherein said first cryptogram is a provider digital signature of the service provider.

6. The method of claim 1, wherein:

the service provider comprises a provider key which is the result of a one-way function of a root key parameterized by the provider identifier, said root key being stored in the authentication device;

said pairing key is calculated by the service provider as being the result of a one-way function of the provider key parameterized by the device identifier; and said pairing key is calculated by the authentication device as being the result of a one-way function of the root key parameterized by the provider identifier and by the device identifier.

7. The method of claim 6, wherein:

said authentication device and said service provider both comprise: a shared value, the provider identifier and the device identifier as pairing data; and said pairing key is determined by raising said shared value to the power of the product of the provider identifier and the device identifier.

8. The method of claim 7, wherein:

said shared value is a root key;

said authentication device comprises a device key which is the result of the root key raised to the power of device identifier;

said service provider comprises a provider key which is the result of said root key raised to the power of provider identifier;

said pairing key is determined at the authentication device by raising the device key to the power of the provider identifier; and said pairing key is determined at the service provider by raising the provider key to the power of the device identifier.

9. The method of claim 1, wherein said authentication request further comprises a second challenge generated by the authentication device and identifiable by the service provider.

10. The method of claim 1, further comprising providing a user access to said authentication device by entering a PIN code in said authentication device; and if the entered PIN code is recognized as being correct by said authentication device, authorizing the performance of the other steps of the method.

11. An authentication device for authenticating a user to a service provider among a plurality of service providers, comprising:

a non-volatile secured memory for storing secret and shared data;

a unique device identifier;

a user interface for user data input;

a display; and a crypto-processor for performing cryptographic and logical operations and for verifying a validity of an existing user account in said plurality of service providers;

wherein the non-volatile secured memory is organized for storing, in an orderly manner, data relating to the plurality of service providers and the crypto-processor is able to retrieve, from said non-volatile secured memory, data relating to each of said plurality of service providers for processing said data relating to each of said plurality of service providers separately from the data relating to each other of said plurality of service providers.

12. The authentication device of claim 11, wherein said data relating to each of said plurality of service providers are each stored in a provider record within the non-volatile secured memory.

13. The authentication device of claim 11, wherein said crypto-processor is configured to retrieve data relating to each of said plurality of service providers by sequentially comparing a provider identifier of a message received from one of said plurality of service providers with each identifier comprised in pairing data stored in records of said one of said plurality of service providers.

14. The authentication device of claim 13, further comprising a communication interface for data exchange with the plurality of service providers, either directly or via a terminal.

* * * * *